US012650776B2

(12) United States Patent
Enukonda et al.

(10) Patent No.: US 12,650,776 B2
(45) Date of Patent: Jun. 9, 2026

(54) PERFORMING MODULATION OPERATIONS IN A MEMORY SUB-SYSTEM

(71) Applicant: Micron Technology, Inc., Boise, ID (US)

(72) Inventors: Prashanth Reddy Enukonda, Hyderabad (IN); Tingjun Xie, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/966,666

(22) Filed: Dec. 3, 2024

(65) Prior Publication Data

US 2025/0208762 A1 Jun. 26, 2025

Related U.S. Application Data

(60) Provisional application No. 63/614,153, filed on Dec. 22, 2023.

(51) Int. Cl.
G06F 12/00 (2006.01)
G06F 3/06 (2006.01)

(52) U.S. Cl.
CPC .......... G06F 3/0616 (2013.01); G06F 3/0638 (2013.01); G06F 3/0679 (2013.01)

(58) Field of Classification Search
CPC ..... G06F 3/0616; G06F 3/0638; G06F 3/0679
See application file for complete search history.

(56) References Cited

U.S. PATENT DOCUMENTS

| | | | | |
|---|---|---|---|---|
| 10,635,400 | B2 * | 4/2020 | Sharon | G06F 12/0246 |
| 2016/0078252 | A1 * | 3/2016 | Chandra | G06F 21/72 |
| | | | | 713/190 |
| 2017/0351449 | A1 * | 12/2017 | Kim | G11C 13/0069 |
| 2020/0019843 | A1 * | 1/2020 | Han | H04L 9/0631 |
| 2022/0100416 | A1 * | 3/2022 | Zhu | G06F 3/064 |
| 2023/0146377 | A1 * | 5/2023 | You | G11C 11/406 |
| | | | | 714/6.12 |

* cited by examiner

*Primary Examiner* — Shawn X Gu
*Assistant Examiner* — Mohammad S Hasan
(74) *Attorney, Agent, or Firm* — Lowenstein Sandler LLP

(57) ABSTRACT

Systems and methods are disclosed including a memory device and a processing device, operatively coupled with the memory device, to perform operations comprising: receiving a write command to store data on the memory device; identifying a block of the memory device referenced by the write command; identifying, based on a number of pages in the block, a number of bits of an address referenced by the write command; generating a seed value by performing one or more transformation operations on a subset of bits comprising the identified number of bits of the address; generating an output sequence using the seed value; generating modulated data by performing one or more bitwise operations on the output sequence and the data; and storing, in the block of the memory device, the modulated data.

20 Claims, 5 Drawing Sheets

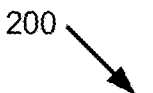

200

RECEIVE A WRITE COMMAND TO STORE WRITE DATA TO A MEMORY DEVICE 210

PROGRAM THE WRITE DATA REFERENCED BY THE WRITE COMMAND TO ONE OR MORE SLC BLOCKS 220

SELECT A SET OF SLC BLOCKS TO FOLD INTO A QLC BLOCK 230

IDENTIFY A PAGE ADDRESS OF THE QLC BLOCK 240

IDENTIFY A SUBSET OF BITS FROM THE PAGE ADDRESS TO USE FOR GENERATING A SEED VALUE 250

GENERATE A SEED VALUE BY PERFORMING ONE OR MORE TRANSFORMATION OPERATIONS ON THE SUBSET OF BITS 260

GENERATE AN OUTPUT SEQUENCE USING THE SEED VALUE 270

GENERATE MODULATED DATA BASED ON THE WRITE DATA AND THE OUTPUT SEQUENCE 280

STORE THE MODULATED DATA IN THE MEMORY DEVICE 290

FIG. 2

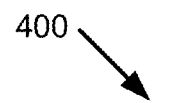
400
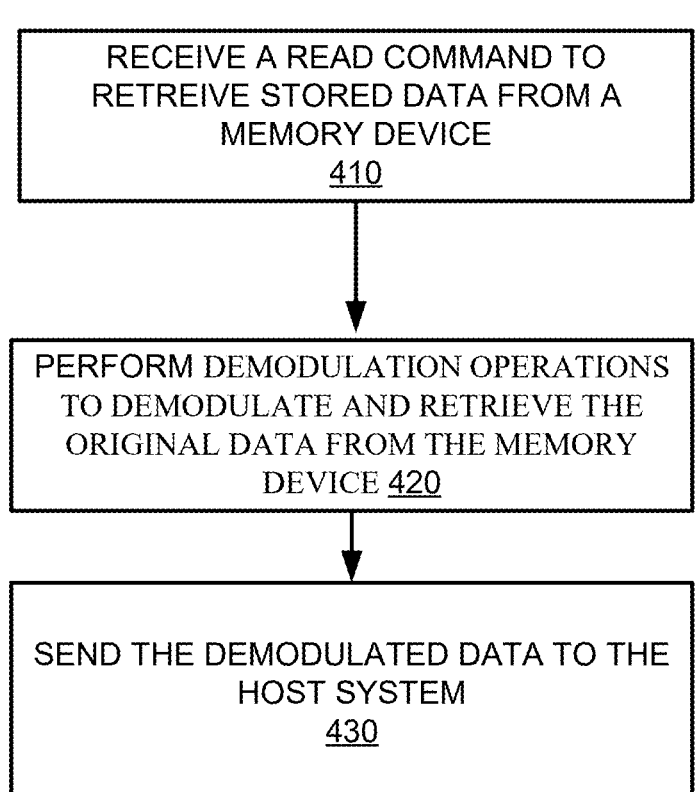
RECEIVE A READ COMMAND TO
RETREIVE STORED DATA FROM A
MEMORY DEVICE
410
PERFORM DEMODULATION OPERATIONS
TO DEMODULATE AND RETRIEVE THE
ORIGINAL DATA FROM THE MEMORY
DEVICE 420
SEND THE DEMODULATED DATA TO THE
HOST SYSTEM
430
FIG. 4

PERFORMING MODULATION OPERATIONS IN A MEMORY SUB-SYSTEM

RELATED APPLICATION

This application claims the benefit of U.S. Provisional Application No. 63/614,153, filed Dec. 22, 2023, the entire content of which is hereby incorporated by reference.

TECHNICAL FIELD

Implementations of the disclosure relate generally to memory sub-systems, and more specifically, relate to performing modulation operations based on a function of the number of pages in a block of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 2 is a flow diagram of an example method to perform modulation operations based on a function of the number of pages in a block of a memory sub-system, in accordance with some implementations of the present disclosure.

FIG. 4 is a flow diagram of an example method to perform demodulation operations, in accordance with some implementations of the present disclosure.

DETAILED DESCRIPTION

Figure 1:
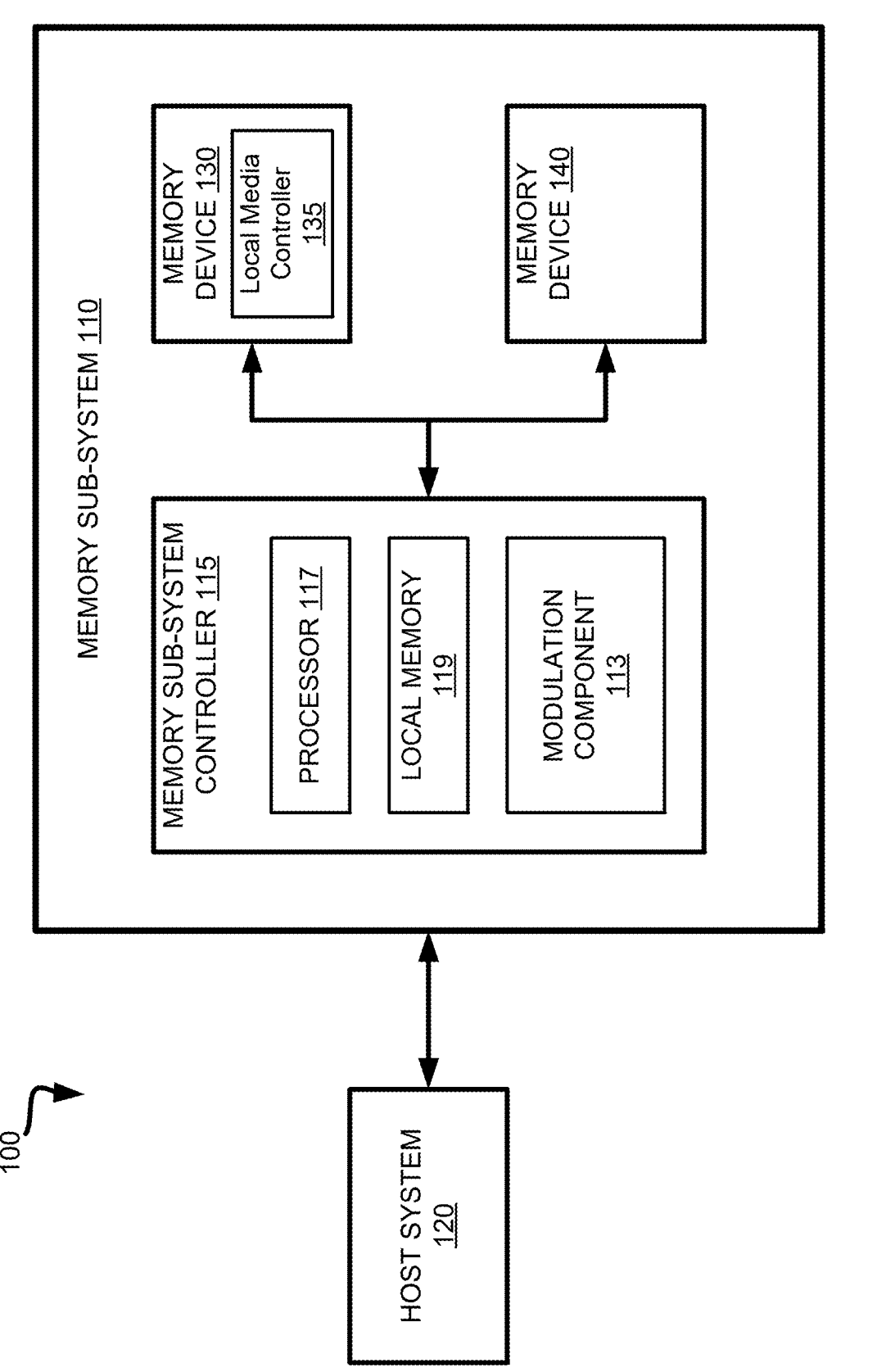
FIG. 1 illustrates an example computing system that includes a memory sub-system in accordance with some implementations of the present disclosure.

Aspects of the present disclosure are directed to performing modulation operations based on a function of the number of pages in a block of a memory sub-system. The memory sub-system can be a storage device, a memory module, or a combination of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described in conjunction with FIG. 1. A non-volatile memory device is a package of one or more dies. Each die can include one or more planes. For some types of non-volatile memory devices (e.g., NAND devices), each plane includes a set of physical blocks. Each block consists of a set of pages. Each page includes a set of memory cells ("cells"). A cell is an electronic circuit that store information. Depending on the cell type, a cell can store one or more bits of binary information, and has various logic states that correlate to the number of bits being stored. The logic states can be represented by binary values, such as "0" and "1," or combinations of such values.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells. A memory device can include multiple portions, including, e.g., one or more portions where the sub-blocks are configured as SLC memory and one or more portions where the sub-blocks are configured as multi-level cell (MLC) memory that can store three bits of information per cell and/or (triple-level cell) TLC memory that can store three bits of information per cell. The voltage levels of the memory cells in TLC memory form a set of 8 programming (or threshold voltage (Vt)) distributions representing the 8 different combinations of the three bits stored in each memory cell. Depending on how the memory cells are configured, each physical memory page in one of the sub-blocks can include multiple page types. For example, a physical memory page formed from single level cells (SLCs) has a single page type referred to as a lower logical page (LP). Multi-level cell (MLC) physical page types can include LPs and upper logical pages (UPs) and store two bits of information per cell. Further, TLC physical page types can include LPs, UPs, and extra logical pages (XPs) and store three bits of information per cell. Further, quad-level (QLC) physical page types can include LPs, UPs, XPs and top logical pages (TPs) and store four bits of information per cell. For example, a physical memory page formed from memory cells of the QLC memory type have a total of four logical pages, where each logical page stores data distinct from the data stored in the other logical pages associated with that physical memory page, herein referred to as a "page." MLC memory, TLC memory, QLC memory and PLC memory can be referred to as higher-level cell (HLC) memory.

A memory device typically experiences random workloads, which can impact the threshold voltage (Vt) distributions, which can be shifted to higher or lower values. Further, the read window budget (RWB), e.g., formed from the read window margins between threshold voltage distributions, can be impacted by cell-to-cell interference. If these read window margins are degraded from widening Vt distributions, it can be difficult to read the logical states out of the memory cells, resulting in an increased read bit error rate (RBER). Cell-to-cell interference occurs when a next logical program of memory cells (e.g., coupled with word line n+1 "WLn+1") causes the threshold voltage (Vt) distribution of victim memory cells (e.g., coupled with WLn) to widen, thus degrading the read window margins between Vt distributions of the WLn victim memory cells. In this scenario, the memory cells associated with WLn+1 are physically adjacent to the memory cells associated with WLn. This cell-to-cell interference imparted to the WLn memory cells is a function of the WLn+1 aggressor memory cells incurring a threshold voltage (Vt) swing when being programmed from an erase state to a set of threshold voltage distributions.

Thus, to minimize cell-to-cell interference, certain memory devices utilize a two-pass, coarse-fine programming algorithm, in which the memory cells associated with $WL_n$ first undergo a coarse programming that results in unreadable $V_t$ distributions. Then, later, after the aggressor memory cells associated with $WL_{n+1}$ have also been coarse programmed, the memory cells associated with $WL_n$ are fine programmed. When this alternating nature of coarse-to-fine programming across word lines is followed to store a page of data along $WL_n$ and another page of data along WLn+1, final read window margins of a set of threshold voltage distributions become readable. In this way, there is a transition by the $WL_{n+1}$ aggressor memory cells being programmed from an erased $V_t$ distribution to a coarse set of $V_t$ distributions instead of going directly from the erased $V_t$ distribution to the final set of fine $V_t$ distributions, enabling reduction in the cell-to-cell interference as programming progresses due to incurring smaller $V_t$ swings with each programming operation. With a coarse-fine programming algorithm, for example, read window margins for QLC-programmed memory cells can be significantly improved to achieve maximum bits-per-cell for bit-cost scaling.

The coarse-fine programming algorithm can use SLC memory that is dedicated to buffer QLC data that is being programmed. This buffering of data is required because coarse-programmed $V_t$ distributions have heavily-overlapped states, and thus are unreadable while waiting to undergo fine programming into final $V_t$ distributions that are readable. Thus, the QLC data is first buffered in SLC blocks of memory so the QLC data is available for the fine programming. For example, according to one coarse-fine programming algorithm of QLC memory, at least 5 coarse QLC pages of data (or approximately 20 SLC pages of data) to be programmed across two adjacent word lines need to be buffered in SLC blocks. To perform the fine-course programming, some memory systems use a media management operation (e.g., such as a copyback operation or internal data move (IDM) processes) in which data is copied from the SLC memory to the QLC memory (or any HLC memory). The copyback operation allows for compacting data from the SLC memory into the QLC memory, as multiple bits of SLC data can be stored within a single cell of the QLC memory. The memory sub-system controller can control copyback operations within the memory device, for example, to convert SLC data to high-density data and thereby free up additional memory array space for more data. In some cases, the SLC memory is used as SLC cache where the data stored in SLC cache are copied into HLC data as the memory device is freed up from other program, read, and erase operations to do so.

In order to improve endurance of a memory device, data to be written to the memory device can be modulated to achieve a desired distribution of the charge levels in the memory cells addressable by a given word line and, in some implementations, also in the memory cells addressable by neighboring word lines of the given word line. For example, in some memory sub-systems, data from a host system can be modulated by utilizing a random value during a modulation operation (e.g., a scrambling operation) and storing the modulated data on the memory components. The memory sub-system can utilize a pseudorandom number generator (PRNG) (e.g., a randomizer) to generate the random values. For example, the memory sub-system can provide an initial value (e.g., a seed value) to the PRNG and the PRNG can proceed to output a sequence based on the seed value. The PRNG, thus, changes the write data to modulated data, which is stored by the memory sub-system in a pattern different from a pattern in which the unmodulated write data would have been stored. By modulating the write data, the memory sub-system can distribute the write data more uniformly across the word lines and bit lines of a data block, which allows for a more even voltage distribution and reduced overuse of the same memory cells.

However, the PRNG is deterministic since the output of the PRNG is fully determined by the seed value that is provided to the PRNG. In an illustrative example, the PRNG selects a seed value based on 8 bits of a physical block address (PBA), which only allows for a fixed number of combinations (e.g., 256). As long as PBAs have the same values on these bits, the PRNG generates the same data sequence for these PBAs. The PRNG is therefore susceptible to reusing specific data patterns since the amount of memory cells in a block far exceeds the amount of different combinations generated by a conventional PRNG. Repeatedly programming memory cells in the same data pattern (e.g., programming on the same bit line or on the same word line to the same data state), can cause issues such as program disturb and premature degradation of the memory cells.

Aspects of the present disclosure address the above and other deficiencies by providing a memory sub-system that performs modulation operations based on a function of the number of pages in a block of a memory sub-system. According to the aspects of the present disclosure, the memory sub-system can receive a write command to store write data at a location referenced by a physical address of the page (referred to as a "page address") of a destination block (e.g., a QLC block). A page address is a memory address that is represented in the form of a binary number in order to enable access a corresponding page of the memory device. In response, the memory sub-system can select a number of bits of the destination page address to use for generating a modulation seed value. The number of bits to use can be determined using one or more formulas and/or equations and can be based on the number of pages in the QLC block.

In an illustrative example, in response to receiving a write command, the memory sub-system controller can program the data reflected in the write command to an SLC cache on the memory device. The memory sub-system controller can then select a set of SLC data from the SLC cache to program (e.g., via two-pass, coarse-fine programming) into QLC memory. For example, the memory sub-system controller can select four SLC blocks to program to a particular destination QLC block. The memory sub-system controller can then determine the number of pages in the destination block and determine intermediate value by determining the log base 2 value of the number of pages in the destination block (expressed by the following formula: $Q=[\log_2(\text{number of pages in the destination block})]$, where the intermediate value is expressed as the term "Q"). For example, responsive to the number of pages in the destination block being 2816, the intermediate value would be 11.46. To determine the number of page address bits to consider for the seed value, referred to as the seed identifier value, the memory sub-system controller can then perform a series of probing operations using the condition $n-1<Q<n+1$, where the seed identifier value (expressed as the term "n") is separately equal to each positive integer (e.g., 1, 2, 3, . . . , x) in a sequence until the condition is true. For example, using the intermediate value of 11.46, seed identifier value is equal to 12 (i.e., (12−1)<11.46<(12+1)) is true). Thus, 12 bits of the page address (expressed using the nomenclature PA [0:11]) can be used to generate the seed value.

The seed value can have the same number of bits as the page address. Thus, to generate a 32-bit seed value using the identified number of bits (e.g., 12 bits) of the page address, the identified number of bits can be repeated and concatenated (strung) together until the 32-bit seed value is formed. In one example, the first 12 bits of the seed value (expressed using nomenclature seed [0:11]) can equal to a first iteration of the seed identifier value (e.g., PA [0:11]), the second 12 bits of the seed value (expressed using nomenclature seed [12:23]) can equal to another iteration of the seed identifier value (e.g., PA [0:11]), and the final 8 bits of the seed value (expressed using nomenclature seed [24:31]) can equal to the first 8 bits of another iteration of the seed identifier value (e.g., PA [0:7]). Thus, two full iterations and one partial iteration of the 12-bits of the page address are used to generate the seed value. In some implementations, certain iterations of the 12-bits can be modified. For example, certain iterations can be inverse (e.g., each bit value is flipped), certain iterations can be offset by a predetermined value, (e.g., the first iteration can be offset by a first offset value, the second iteration can be offset by a second offset value different from the first offset value, etc.). This can improve the randomness of the modulation operations.

The memory sub-system can then use the seed values to generate an output sequence of bits. For example, the memory sub-system can feed the seed value into a PRNG to generate the output sequence. The output sequence can be a pseudo-random vector (i.e., a sequence of bits of a specified size) produced by the PRNG from the seed value. The memory sub-system can then generate modulated data by combining (e.g., using a bitwise operation) the write data with the output sequence, and storing the modulated data on the memory device.

Advantages of the present disclosure include, but are not limited to, increased randomness of modulation operations performed by the memory sub-system. By increasing the randomness of modulation operations, the present disclosure improves distribution of write data to memory cells, enabling the memory sub-system to distribute the write data more uniformly across the word lines and bit lines of a data block, which allows for a more even voltage distribution and reduced overuse of the same memory cells. Further, the present disclosure improves the health and increases the lifetime of the memory device by preventing same data patterns programmed to the memory device.

FIG. 1 illustrates an example computing system 100 that includes a memory sub-system 110 in accordance with some implementations of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO- DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, PLCs or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another implementation of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address (PBA)) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

In some implementations, the memory sub-system 110 includes a modulation component 113 that can perform modulation and demodulation operations based on a function of the number of pages (or other management units) in a block. A management unit can represent an individual segment of the memory device that can be written or erased in a single operation. In some implementations, a management unit can be a page, a group of pages across one or more dies, a particular set of memory cells, etc. In some implementations, the memory sub-system controller 115 includes at least a portion of the modulation component 113. In some implementations, the modulation component 113 is part of the host system 110, an application, or an operating system. In other implementations, local media controller 135 includes at least a portion of modulation component 113 and is configured to perform the functionality described herein.

The modulation component 113 can perform modulation and demodulation operations based on a function of the number of pages (or other management units) in a block. In some implementations, the modulation component 113 can receive a write command to store write data on memory device 130 and/or memory device 140. The write data can include, for example, a page, multiple pages, or any other unit of data. The write command can include one or more LBAs, which can be translated to one or more PBAs and/or one or more page addresses of a respective PBA.

The modulation component 113 can perform one or more transformation operations on one or more subsets of bits of the page address to generate a seed value. A transformation operation can include bitwise operations, concatenation operations, hash operations, or any other appropriate operation. A bitwise operation can include an AND operation, a NOT operation, an OR operation, an exclusive OR (XOR), bit shifting, or any other operation that operates on the individual bits of a bit string, a bit array, or a binary numeral. The number of bits in each of the one or more subsets can be determined using a function, as will be discussed in detail below. In the implementations discussed herein, the number of bits in a seed value is the same as the number of bits in a destination page address (e.g., for a 32-bit page address, a 32-bit seed value is generated). However, it is noted that in other implementations, the bit value of the seed value does not need to equal the bit value of the page address.

In some implementations, the modulation component 113 can use the bitwise operations on one or more subsets of bits of the page address to generate the seed value. By way of illustrative example, each page address can include 32 bits (e.g., four bytes of eight bits each), represented using the following nomenclature: [0:31]. It is noted that, although the implementations of this disclosure relate to a page address of four bytes, the systems and methods discussed herein can be used with a page address of any size (e.g., two bytes, three bytes, five bytes, etc.). To determine the number of bits to use for generating the seed value, modulation component 113 can use one or more particular equations, conditions, and/or formulas. In one illustrative implementation, modulation component 113 can first determine an intermediate value by determining the log base 2 value of the number of pages in the destination block. In particular, the Q value can be determine using the formula $Q=[\log_2(\text{number of pages in the destination block})]$, where Q is the intermediate value, hereafter referred to as the Q-determining formula. Modulation component 113 can then perform a series of probing operations using the n-determining condition of $n-1<Q<n+1$, where the seed identifier value (expressed by the term "n") is separately equal to each positive integer (e.g., 1, 2, 3, . . . , x) in a sequence (e.g., an ordered list of all positive integers) until the condition is true. The determined seed identifier value can reflect the number of bits of a page address to use to generate the seed value. The number of pages in a destination block (e.g., a QLC block) can be known by the memory sub-system and stored in, for example, a data structure such as a metadata table. In some implementations, the memory sub-system controller 115 can maintain metadata tables which track the number of pages in each block of memory device 130.

In an illustrative example, the number of pages in a QLC destination block can be 2816. Thus, using the Q-determining formula, modulation component 113 can determine the intermediate value to be 11.46 (e.g., $\log_2(2816)=11.46$). Using the Intermediate value of 11.46, modulation component 113 can determine the value of n to be 12 (e.g., $(12-1)<11.46<(12+1)$) is true).

With the value of n being determined to be 12, thus, 12 bits of the page address of the destination block can be used to generate the seed value. The 12 bits can be the least significant bits of the page address (the bits in a binary numeral with the smallest value, such as those generally the farthest to the right in the binary numeral), the most significant bits of the page address (the bits in a binary numeral with the largest value, such as those generally the farthest to the left in the binary numeral), random bits of the page address, a particular portion of the page address, etc. An n value of 12 can be expressed using the nomenclature [0:11].

To generate a 32-bit seed value (or any other sized seed value) using the n number of bits (e.g., 12 bits) of the page address, the n number of bits can be repeated and concatenate together until the 32-bit seed value is formed (e.g., seed value portion [0:11]=page address [0:11], seed value portion [12:23]=page address [0:11], and seed value portion [24:31]=page address [0:7]. Thus, three iterations of the 12-bits of the page address are used to generate the seed value. In some implementations, using 12-bits by way of example, certain iterations of the 12-bits can be modified. For example, one or more bits in certain iterations can be inverse (e.g., one or more bit values can be flipped from 1 to 0 or from 0 to 1), certain iterations can be offset by a predetermined value, (e.g., the first iteration can be offset by a first offset value, the second iteration can be offset by a second offset value different from the first offset value, etc.). This can improve the randomness of the modulation operations. In an illustrative example, seed value portion [0:11] can equal to page address [0:11] plus an offset value A, seed value portion [12:23] can equal to inverse of page address [0:11] plus offset value B, and seed value portion [24:31] can equal page address [0:7] plus offset value C.

In some implementations, to generate a 32-bit seed value using the 12 bits of the PA, modulation component 113 can perform bitwise operations on the bits of the first iteration of n-bits (e.g., 12 bits), then perform bitwise operations on the second iteration of n-bits (e.g., 12 bits), then lastly perform bit-wise operations on the third iteration of n-bits (e.g., the first 8 bits of the n-value). In one example, the modulation component 113 can perform bitwise XOR operations on the bits of the first iteration to generate a value, then perform bit-wise XOR operations on the bits of the second iteration to generate another value, and lastly perform bitwise XOR operations on the third iteration to generate a final value. To generate each value, the bitwise operations can be similar or the same as each other, different from each other, or any combination thereof. In additional or in the alternative, each iteration can include one or more modification (e.g., inversion, offset, etc.). Modulation component 113 can then combine the values or perform additional bitwise operations on the values to generate the seed value. Any combination of bitwise operations (or concatenation operations or hash operations), mathematical functions, or combining can be used to generate any combination of values to generate the seed value. In other implementations, the seed value can be any size, such as, for example, a 4-bit value, an 8-bit value, a 16-bit value, etc.

Using the seed value, the modulation component 113 can generate an output sequence. In some implementations, the modulation component 113 can feed the seed value into a random number generator (e.g., a pseudorandom number generator (PRNG) to generate the output sequence). The PRNG can use any method to generate the output sequence from the seed value, such as, for example, the Middle- Square Method, the Lehmer Generator, the Linear Congruential Generator (LCG), the Lagged Fibonacci Generator (LFG), etc.)

In some implementations, the modulation component 113 can use the output sequence of the values to transform the write data to modulated data, which is stored on the memory device 130, 140 in a pattern different from a pattern in which the unmodulated write data would have been stored. In some implementations, the modulation component 113 can perform a bitwise operation(s) on the output sequence and the write data to generate the modulated data. For example, the modulation component 113 can perform bitwise XOR operations on at least one value of the output sequence and at least a portion of the write data to randomize the write data (or each portion of write data). The modulated data can be stored on at least one of memory device 130 and/or memory device 140.

The modulation component 113 can perform demodulation operations to demodulate and retrieve the original data from the memory device 130 and/or memory device 140. For example, modulation component 113 can use a demodulation function (e.g., a bitwise operation with a physical block address(es) and/or page address(es) of the data portion(s)) which, due to its symmetric nature, can demodulate and retrieve the data. In some implementations, the modulated data can be stored in a data structure, such as, for example, a data modulation table. Accordingly, the modulation component 113 can use the data structure to demodulate and retrieve (or aid in demodulation and retrieving) the original data.

FIG. 2 is a flow diagram of an example method 200 to perform modulation operations based on a function of the number of pages in a block of a memory sub-system, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 200 is performed by the modulation component 113 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

The operations of method 200 can relate to performing a copyback of SLC data to QLC data. However, it is noted that the operations of method 200 can be performed between any types of SLC or HLC data (e.g., SLC to HLC, SLC to SLC, HLC to HLC, or HLC to SLC). Method 200 will be discussed in relation to the copyback operations being performed from a set of SLC source blocks to a QLC destination block. However, it should be understood that method 600 can be performed using any sized memory granularity, such as, but not limited to, a set of SLC source blocks and a HLC destination block, a set of SLC source memory pages and a HLC destination memory page, etc.

At operation 210, processing logic receives a write command to store data to a memory device. The write command can be initiated by a host (e.g., host 120) or by a memory sub-system controller (e.g., memory sub-system controller 115). The write command can specify a logical address, which can be translated by the processing logic into a physical block address and/or one or more page addresses. In some implementations, responsive to receiving the write command, the processing logic can identify a source block(s) in the SLC portion of the memory device (e.g., an SLC cache), and a destination block(s) in a QLC portion of the memory device. In particular, the processing logic can identify (in each the source block and destination block) one or more word lines that address a set of memory cells (e.g., a page(s)) onto which to program the data referenced by the write command.

At operation 220, processing logic programs the data referenced by the write command to one or more SLC blocks.

At operation 230, processing logic selects a set of SLC blocks (e.g., four SLC blocks) to fold into a QLC block. The set of memory pages can be selected at random, sequentially, based on a predefined order, based on address location, etc.

At operation 240, processing logic identifies a page address of the QLC block. In some implementations, the processing logic can select a next available page address of the QLC block. For example, if the QLC block is blank, the processing logic can select the first page (or word line) of the QLC block. If a set of pages (or word lines) are already programmed to, the processing logic can select the subsequent page (or word line) to the last programmed page (or word line). In an illustrative example, the page address can include four bytes (thus, 32 bits).

At operation 250, processing logic identifies a subset of bits from the page address to use for generating a seed value. In some implementations, the processing logic can use the Q-determining formula (i.e., $Q=[\log_2(\text{number of pages in the destination block})]$) and the n-determining condition (i.e., $n-1 < Q \leq n+1$) to identify the subset of bits to use for generating the seed value. The subset of bits can reflect the determined "n" value (e.g., the seed identifier value). In some implementations, the subset off bits can be the "n" amount of least significant bits of the page address), the "n" amount of most significant bits of the page address, the "n" amount of random bits of the page address, the "n" amount of a particular portion of the page address, etc.

At operation 260, processing logic generates a seed value by performing one or more transformation operations on the subset of bits. In some implementations, the subset of bits can be a concatenated string of iterations and/or partial iterations of the subset of bits. In some implementations, can perform a bitwise operation on each bit of the subset of bits and/or the string of iterations to generate the seed value. The bitwise operation can include AND operations, NAND operations, OR operations, XOR operations, bit shifting operations, etc. In some implementations, the processing logic can perform concatenation operations, hash operations, or any other appropriate operation on the subset of bits and/or iterations to generate a seed value.

At operation 270, the processing logic generates an output sequence using the seed value. In some implementations, the processing logic can feed the seed value into a PRNG to generate the output sequence. The output sequence can be a pseudo-random vector (i.e., a sequence of bits of a specified size) produced by the PRNG from the seed value.

At operation 280, the processing logic generates modulated data based on the write data and the output sequence. For example, the processing logic can transform the write data by combining (e.g., using a bitwise operation) the write data with the output sequence.

At operation 290, the processing logic stores the modulated data in the memory device. For example, the processing logic can store the modulated data in the QLC block. The modulated data enables the processing logic to distribute write data more uniformly across the word lines and bit lines of a data block, allowing for a more even voltage distribution and reduced overuse of the same memory cells.

Figure 3:
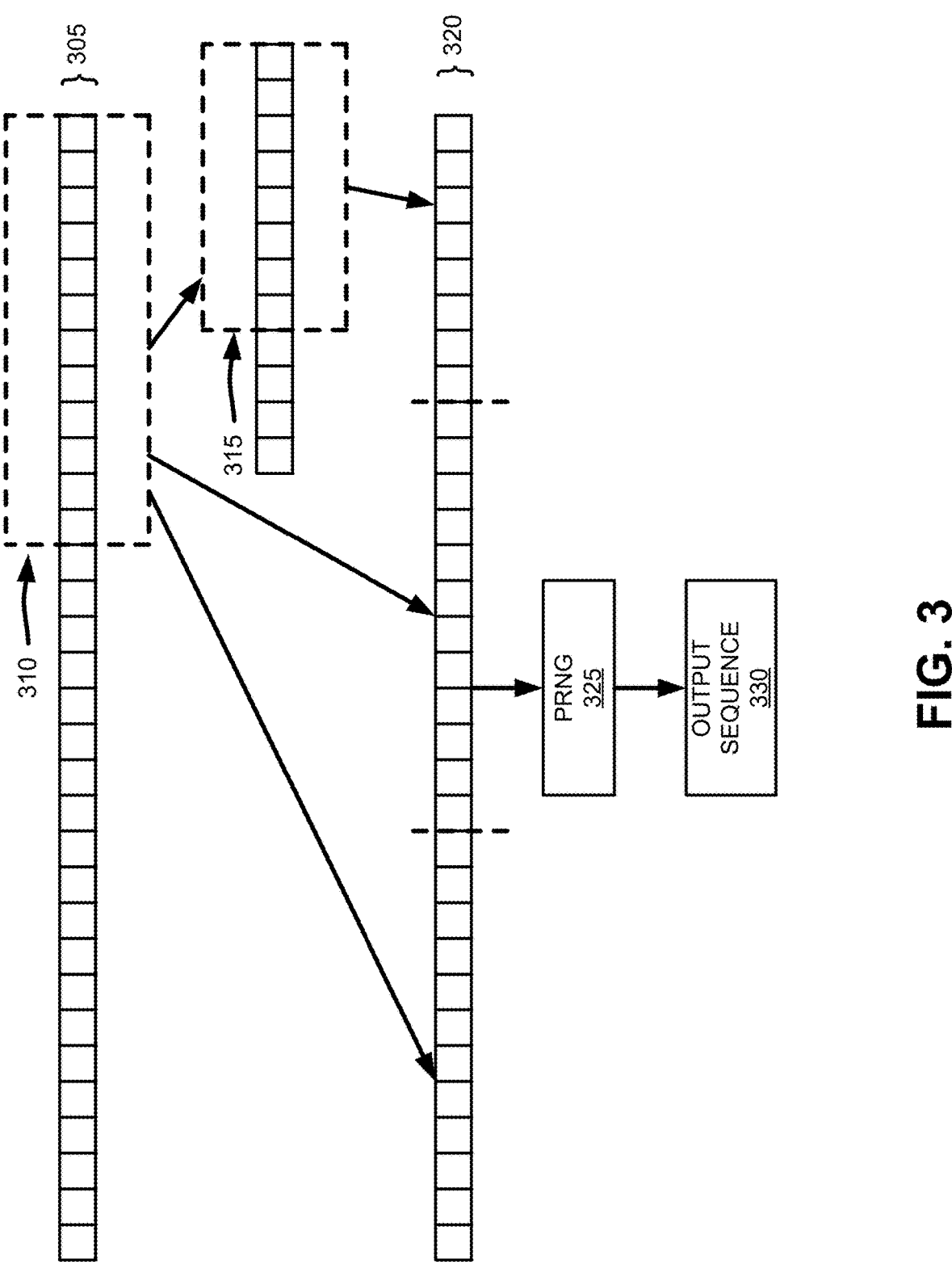
FIG. 3 schematically illustrates an example seed generating operation, in accordance with some implementations of the present disclosure.

FIG. 3 schematically illustrates an example seed generating operation, in accordance with some implementations of the present disclosure. Page address 305 includes 32 bits. The determined "n" number of bits of the page address to use in generating the seed can be 12 bits. As such, the 12 least significant bits (bit subset 310) of page address 305 can be selected to generate seed 320, which includes two iterations of bit subset 310 and one iteration of bit subset 315 (which includes the first 8 bits of bit subset 310. In some implementations, the two iterations of bit subset 310 and the one iteration of bit subset 315 can be combined sequentially, numerically, randomly, etc. In some implementations, the two iterations of bit subset 310 and the one iteration of bit subset 315 can be combined using one or more bitwise operations on the iterations generate the seed value 320. Seed value 320 can then be fed into PRNG 325 to generate an output sequence 330.

FIG. 4 is a flow diagram of an example method 400 to perform demodulation operations, in accordance with some implementations of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 400 is performed by the modulation component 113 of FIG. 1. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 410, the processing logic receives, from the host system, a read command to retrieve stored data from a memory device. In some implementations, the read command references a logical block address, a logical page address, a physical block address, a page address, etc. In some implementations, the processing logic can translate the logical block address into a physical block address and/or a logical page address into a physical page address using, for example, a page table. In some implementations, the read command can be received from the memory sub-system controller.

At operation 420, the processing logic performs demodulation operations to demodulate and retrieve the original data from the memory device. For example, randomizer processing logic can use a demodulation function (e.g., a bitwise operation with a physical block address(es) of the data portion(s)) to demodulate and retrieve the data. In some implementations, the modulated data can be stored in a data structure, such as, for example, a data modulation table. Accordingly, the processing logic can use the data structure to demodulate and retrieve (or aid in demodulation and retrieving) the original data.

At operation 430, the processing logic sends the demodulated data to the host system.

Figure 5:
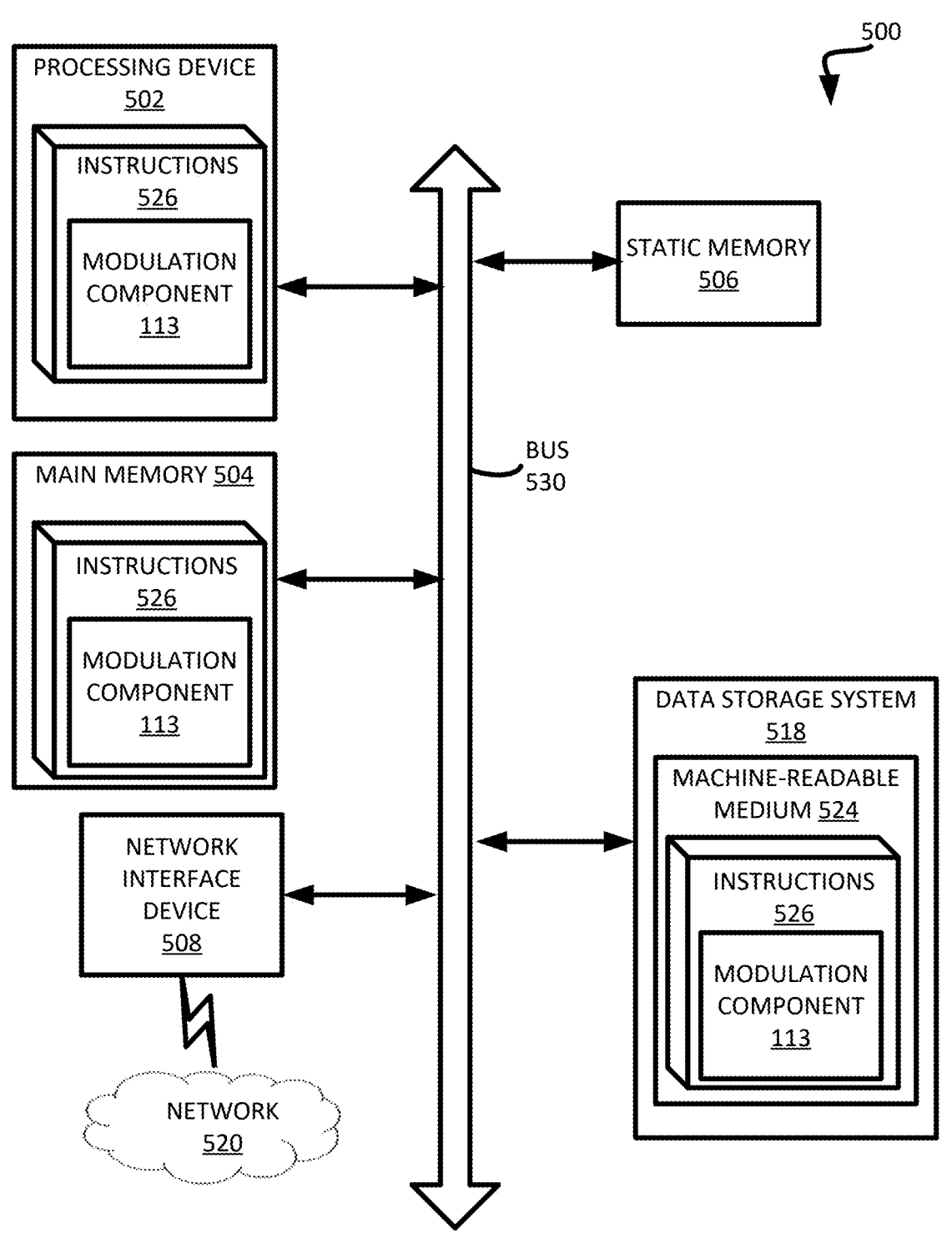
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, can be executed. In some implementations, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the randomization component 113 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one implementation, the instructions 526 include instructions to implement functionality corresponding to a randomization component (e.g., the randomization component 113 of FIG. 1). While the machine-readable storage medium 524 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
   receiving a write command to store data on the memory device;
   identifying a block of the memory device referenced by the write command;
   identifying, based on a number of pages in the block, a number of bits of an address referenced by the write command;
   generating a seed value by performing one or more transformation operations on a subset of bits comprising the identified number of bits of the address;
   generating an output sequence using the seed value;
   generating modulated data by performing one or more bitwise operations on the output sequence and the data; and
   storing, in the block of the memory device, the modulated data.

2. The system of claim 1, wherein performing the one or more transformation operations comprises:
   performing one or more concatenation operations on the subset of bits.

3. The system of claim 1, wherein the operations further comprise:
   applying an offset value to the subset of bits.

4. The system of claim 1, wherein the operations further comprise:
   inverting at least one bit in the subset of bits.

5. The system of claim 1, wherein the number of bits is identified based on a log base 2 value of the number of pages in the block.

6. The system of claim 1, wherein the seed value comprises a same number of bits as the identified number of bits of the address.

7. The system of claim 1, wherein the seed value comprises a different number of bits than the identified number of bits of the address.

8. A method comprising:
   receiving a write command to store data on a memory device;
   identifying a block of the memory device referenced by the write command;

identifying, based on a number of pages in the block, a number of bits of an address referenced by the write command;

generating a seed value by performing one or more transformation operations on a subset of bits comprising the identified number of bits of the address;

generating an output sequence using the seed value;

generating modulated data by performing one or more bitwise operations on the output sequence and the data; and storing, in the block of the memory device, the modulated data.

9. The method of claim 8, wherein performing the one or more transformation operations comprises:

performing one or more concatenation operations on the subset of bits.

10. The method of claim 8, further comprising:

applying an offset value to the subset of bits.

11. The method of claim 8, further comprising:

inverting at least one bit in the subset of bits.

12. The method of claim 8, wherein the number of bits is identified based on a log base 2 value of the number of pages in the block.

13. The method of claim 8, wherein the seed value comprises a same number of bits as the identified number of bits of the address.

14. The method of claim 8, wherein the seed value comprises a different number of bits than the identified number of bits of the address.

15. A non-transitory computer-readable storage medium comprising instructions that, when executed by a processing device operatively coupled to a memory, performs operations comprising:

receiving a write command to store data on a memory device;

identifying a block of the memory device referenced by the write command;

identifying, based on a number of pages in the block, a number of bits of an address referenced by the write command;

generating a seed value by performing one or more transformation operations on a subset of bits comprising the identified number of bits of the address;

generating an output sequence using the seed value;

generating modulated data by performing one or more bitwise operations on the output sequence and the data; and storing, in the block of the memory device, the modulated data.

16. The non-transitory computer-readable storage medium of claim 15, wherein performing the one or more transformation operations comprises:

performing one or more concatenation operations on the subset of bits.

17. The non-transitory computer-readable storage medium of claim 15, wherein the operations further comprise:

applying an offset value to the subset of bits.

18. The non-transitory computer-readable storage medium of claim 15, wherein the operations further comprise:

inverting at least one bit in the subset of bits.

19. The non-transitory computer-readable storage medium of claim 15, wherein the number of bits is identified based on a log base 2 value of the number of pages in the block.

20. The non-transitory computer-readable storage medium of claim 15, wherein the seed value comprises a same number of bits as the identified number of bits of the address.

\* \* \* \* \*